United States Patent [19]

Benjamin et al.

[11] 4,237,924

[45] Dec. 9, 1980

[54] FUEL PRESSURE REGULATOR

[75] Inventors: Benjamin C. Benjamin, Flint; Charles A. Detweiler, Durand, both of Mich.

[73] Assignee: Schmelzer Corporation, Durand, Mich.

[21] Appl. No.: 966,615

[22] Filed: Dec. 5, 1978

[51] Int. Cl.³ .............................................. F16K 31/12
[52] U.S. Cl. ..................................... 137/510; 251/85; 251/86
[58] Field of Search ...................... 137/510; 251/85, 86, 251/87

[56] References Cited

U.S. PATENT DOCUMENTS

| | | | |
|---|---|---|---|
| 3,106,219 | 10/1963 | Teston | 137/510 |
| 3,405,730 | 10/1968 | Baumann | 251/85 X |
| 3,406,706 | 10/1968 | Zakka | 251/86 X |
| 3,419,039 | 12/1968 | Monnich | 137/510 |
| 3,511,270 | 5/1970 | Fehrenbach | 137/510 |

FOREIGN PATENT DOCUMENTS

| | | | |
|---|---|---|---|
| 1286357 | 1/1969 | Fed. Rep. of Germany | 251/86 |
| 2263383 | 10/1975 | France | 137/510 |

*Primary Examiner*—Harold W. Weakley
*Attorney, Agent, or Firm*—Fisher, Gerhardt, Crampton & Groh

[57] ABSTRACT

A pressure regulator including a valve assembly in which a spherical valve closure element has a flat closure portion for engagement with an annular valve seat and the spherical element permits rotation and accurate alignment of the closure surface with the seat to avoid leakage.

4 Claims, 5 Drawing Figures

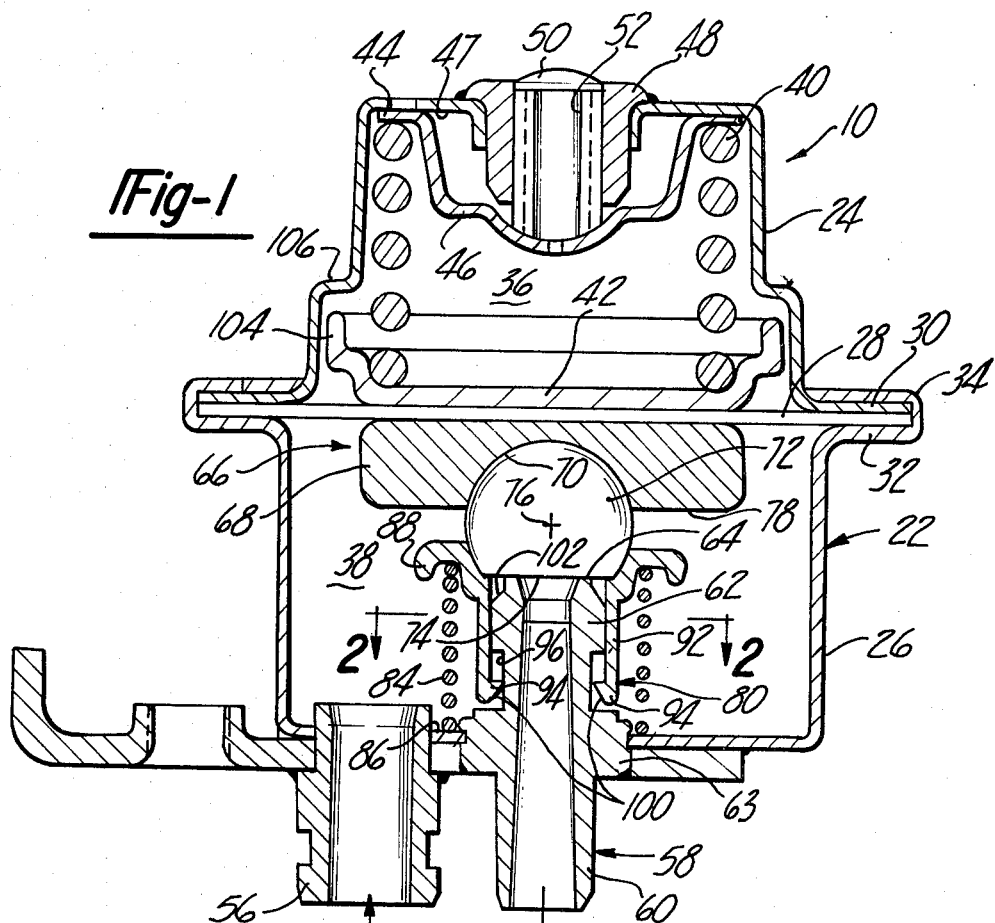

FUEL PRESSURE REGULATOR

This invention relates to pressure regulators and more particularly to fuel pressure regulating valves for fuel injunction systems used with internal combustion engines.

To effectively maintain a constant fuel pressure in a fuel injection system it is imperative that the valve closure member accurately aligns with the valve seat to insure complete valve closing. Also it is important that the valve be immediately responsive to pressure fluctuations to move from its closed position without hysteresis. Fuel leakage in the area of the valve seat due to improper seating results in erratic fuel control.

It is an object of the invention to provide an improved pressure regulator for accurately maintaining a constant fuel pressure.

Another object of the invention is to provide a fuel pressure regulator in which the valve closure member is completely seated in a closed position of the pressure regulator to avoid fuel leakage.

A further object of the invention is to provide a fuel pressure regulator in which the valve closure element is in the form of a sphere with a flat closure portion which allows rotation of the sphere to insure alignment of the closure portion with its valve seat.

A further object of the invention is to provide a fuel pressure regulator with means confining the spring to facilitate assembly.

Still another object of the invention is to provide a fuel pressure regulator with a spherical valve closure element in which the socket has a seating portion for engaging the spherical closure element which is disposed completely to one side of the center of the sphere to minimize resistance to alignment of the closure element with its valve seat.

The objects of the invention are accomplished by a pressure regulator which has a diaphragm responsive to fuel pressure at one side to move relative to a valve and open the latter in the presence of excess pressure to relieve fuel from the regulator and to close and prevent further escape of fuel when the fuel pressure is below some predetermined minimum. The valve closure element is in the form of a sphere with a flat surface engaging an annular valve seat so that the sphere permits rotation of the valve closure element to insure accurate fluid tight alignment between the flat closure surface of the valve seat when the valve is in its closed position. In one embodiment of the invention, a spring retaining means is provided to facilitate assembly and also to insure that the valve will open even in the presence of slight pressure fluctuations. In still other embodiments of the invention the spherical valve closure element is retained in a different manner to permit easy rotation and alignment with the valve seat.

These and other objects of the invention will be apparent from the following description and the drawings in which:

FIG. 1 is a cross sectional view of a pressure regulator with part of the circuit in which the pressure regulator used shown diagrammatically;

FIG. 2 is a cross sectional view taken on line 2—2 in FIG. 1;

Figure 3:
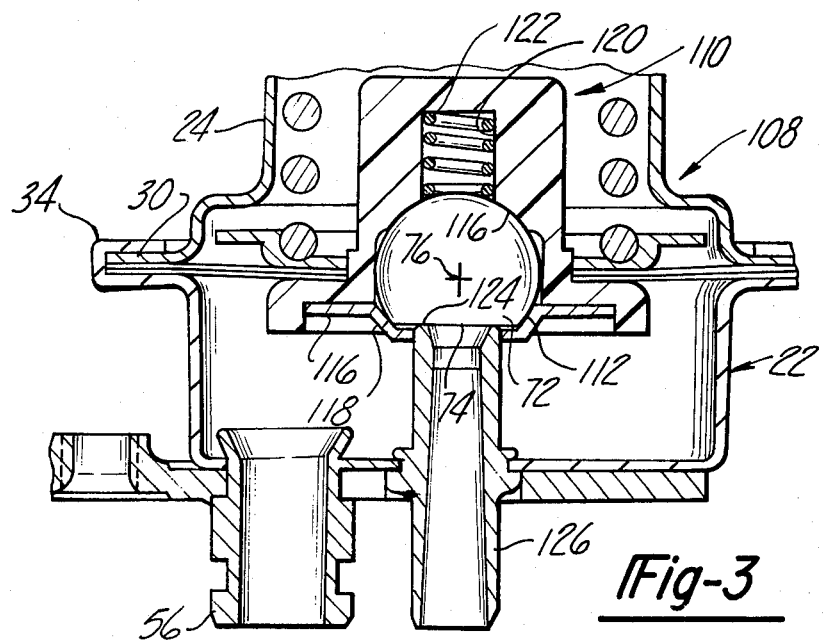
FIG. 3 is a cross sectional view of another embodiment of the invention with portions of the pressure regulator broken away.

Referring to the drawings, the fuel pressure regulator embodying the invention as designated generally at 10 is particularly adapted for use in a fuel metering system including a fuel tank 12 from which fuel is pumped by a pump 14 through a fuel line 16 to fuel metering nozzles 18 associated with the internal combustion engine not shown. Excess fuel passes through the regulator 10 and is returned to the tank 12 by way of a fuel line 20. The fuel pressure regulator 10 is positioned downstream from the fuel metering nozzles 18 and functions as a relief valve maintaining a controlled pressure at the metering nozzles 18.

The pressure regulator 10 includes a housing 22 having a pair of cup shaped cover members 24 and 26 disposed at opposite sides of a diaphragm 28. The outer periphery of the flat diaphragm 28 is clamped between a flange 30 on cover 24 and a flange 32 on cover 26. Flange 26 is bent as indicated at 34 to securely clamp the covers 24 and 26 in pressure type relationship to the diaphragm 28.

The housing covers 24 and 26 form chambers 36 and 38 at opposite sides of the diaphragm 28. The chamber 26 contains a compression spring 40 which has its opposite ends acting against a backing plate 42 abutting the diaphragm 28 and the flange 44 of a cup shaped element 46. The spring 40 maintains the flange 44 in engagement with the interior end wall 47 of a housing cover 24 and acts on the backing plate 42 to urge the diaphragm downwardly as viewed in the drawing. The cover 24 is provided with an internally threaded nut 48 which is rigidly connected in fluid tight relationship to the exterior of the end wall of the cover 24. The threaded nut 48 receives a threaded plug 50. Rotation of the plug moves it axially and moves the element 46 away from the end wall 47 to vary the loading on the spring 40. The plug 50 can have an axial opening 52 which serves to maintain the chamber 36 continuously open to the atmosphere. If preferred, the axial opening 52 can be connected to a vacuum source such as the intake manifold of the internal combustion engine and thereby reflect engine speed and loading by the level of vacuum pressure in the chamber 36.

Chamber 38 communicates by way of an inlet port 56 with the line 16 returning fuel from the fuel metering nozzles. Chamber 39 also communicates by way of a relief port structure 58 with the line 20 which returns fuel to the tank 12. The relief port structure 58 is made of plastic and includes an exterior tube portion 60 and an interior tube portion 62 separated by an integral flange portion 63 which is mounted in fluid tight relationship in the end wall of cover 26.

The end of tube portion 62 forms an annular valve seat 64. The passage of fuel from the chamber 38 and through the relief port structure 58 is under the control of a valve closure assembly 66 which is engageable with the seat 64. The valve closure assembly 66 includes a socket member 68 having a spherical socket portion 70 receiving a spherical element 72. The element 72 has a segment removed to form a flat seat engaging surface 74 disposed to one side of the center of the sphere indicated at 76. The depth of the socket portion 70 is less than the radius of the spherical element 72 so that the center of the sphere 76 is slightly to one side of the bottom face 78 of the member 68.

The spherical element 72 is maintained in seated position in the socket 70 by a retainer 80 which has an annular seat surface 82 complementary to the surface of the spherical element 72. The retainer 80 is urged into engagement with the spherical element 72 by a compression spring 84 one end of which acts against the interior bottom wall 86 of the housing cover 26 and the other end reacts against a flange 88 forming part of the retainer member 80.

The retainer 80 is provided with four fingers 92 which depend from and are flexible relative to the flange 88. The lower ends of the fingers 92 are provided with a hook like stop portion 94 each of which is disposed in an annular groove 96 formed on the outside surface of the tube portion 62. Upward movement of the retainer 80 is limited by engagement of the stops 94 with the upper end of the annular groove 96. Downward movement of the retainer 80 is limited by engagement of the ends of the fingers 92 with the upper surface of the mounting flange 63 formed integrally with and between the tube portions 60 and 62. The principal function of the fingers 92 and stops 94 is to maintain the compression spring 84 and retainer 80 in position during assembly to facilitate positioning of the remainder of the components and yet maintain the spring 84 confined. During the assembly the spring 84 is placed within the cover 24 and in position around the relief port member 58. The ends of the fingers are formed with cam portions 100 which are placed in engagement with complementary cam surfaces 102. Subsequent movement of the retainer 80 axially of the tube portion 60 deflects the fingers 92 until the stop portions 94 come into alignment with the annular groove 96. Thereafter the stop portions 94 enter the annular groove 96 and the fingers 92 are returned to their normal as molded position. The stop portions 94 will engage the upper end of the groove 96 under the urging of the spring 84 until the spherical closure element 72 and the remaining components are placed in assembled position.

In the finally assembled condition of the regulator 10 the stop portion 94 are free to move in the annular groove 96 with downward movement of the spherical element limited by engagement of the flat closure surface 74 with the annular seat 64. Upward movement of the spherical element 72 in an opening direction away from the annular seat 64 is limited by engagement of an annular skirt 104 on the backing plate 42 which engages an offset portion 106 formed in the cover member 24.

During operation of the fuel pressure regulator 10, fuel enters inlet port 56 and occupies the chamber 38 at a pressure determined by the effective area of the diaphragm 28, the load of the compression spring 40, and the pressure present in chamber 36. If the predetermined pressure is exceeded, the pressure acting on the underside of the diaphragm 28 will tend to lift the spherical element 72 from the annular seat 64 to permit fuel to flow through the relief port 58 to the fuel tank 12 to relieve the pressure in chamber 38 and return the element 72 to a closed position. The movement of the spherical element 72 from its closed position on seat 64 is caused by the compression spring 84 acting on the retainer 80 to insure that the valve opens in response to movement of the diaphragm 28 even though the valve is not rigidly attached to the diaphragm 28.

The spherical element 72 is seated in the socket 70 so that it is free to pivot about its center 76 to insure that the flat closure surface 74 comes into accurate and exact engagement with the annular seat 64.

In some installations it may be desirable to maintain the chamber 36 above the diaphragm 28 in communication with the intake manifold of the internal combustion engine so that the pressure regulator 10 reflects engine load. In other installations however, it is sufficient to have the chamber 36 in continuous communication with the atmosphere.

The arrangement of the components is such that the diaphragm 28 is freely suspended between the cover members 24 and 26 so that it forms an impervious wall without any fastening elements passing therethrough. The backing plate 42 and the socket member 68 are urged against opposite sides of the diaphragm 28 through the action of the compression springs 40 and 84 acting in opposition to each other. This arrangement eliminates the possibility of diaphragm leakage to insure long operating life of the diaphragm 28.

Referring now to FIG. 3 another embodiment of the invention is shown in the firm of a pressure regulator 108 in which the spherical element 72 is contained in a carrier assembly 110. The carrier assembly 110 includes a cavity 112 a portion of which forms an annular spherical seat 114 complementary to the spherical surface of the spherical element 72. The spherical element 72 is retained in the cavity 112 by a ring type retainer 116 which has a flange portion 118 approximating the spherical surface of the element 72. The dimensions of the cavity 112 and of the annular seats 114 and flange 118 are such that the spherical element 72 having a diameter of about one-half of an inch can move approximately 0.020 of an inch to permit free rotation about the center of the sphere indicated at 76. A spring cavity 120 is formed axially of the regulator 10 and in the carrier 110 to contain a spring 122 which urges the spherical element 72 axially towards the flange 118. In a closed position, the flat closure surface 74 rests on an annular seat 124 formed at the end of the relief port structure 126. When the valve is in its closed position the spherical element 72 accurately aligns with the seat 124.

Figure 4:
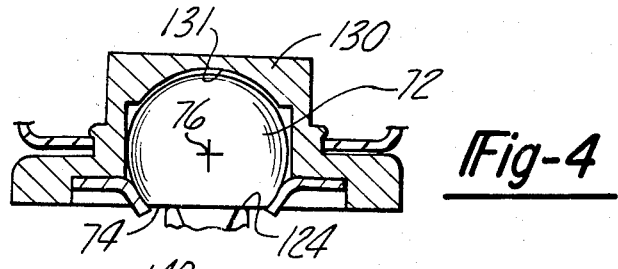
FIG. 4 is a cross sectional view similar to FIG. 3 showing another embodiment of the invention.

Referring to FIG. 4, another embodiment of the invention is shown in which a pressure regulator has its spherical element 72 contained with a carrier 130 to engage a spherical seat portion 131 complementary to the surface of element 72. The arrangement is similar to that illustrated in FIG. 3 except that a spring is not used to urge the spherical element 72 axially of the regulator 128. The carrier is dimensional similarly to the carrier 110 to permit limited axial movement of the element 72 to insure alignment of flat surface 74 with valve seat 124.

Figure 5:
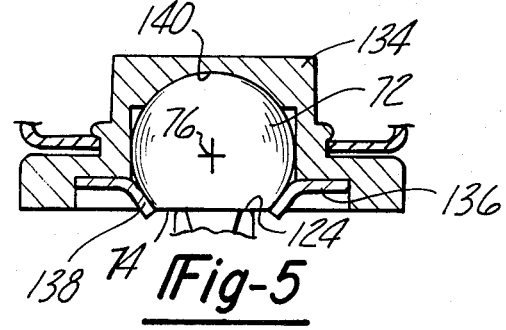
FIG. 5 is a cross sectional view similar to FIGS. 3 and 4 showing still another embodiment of the invention.

Referring now to FIG. 5 still another embodiment of the invention is shown in which the sperical element 72 is housed in a carrier 134 which includes a retaining ring 136 made of spring like metal and is formed with a flange 138 which acts against the spherical element 72 to resiliently urge it into seated engagement with the complementary spherical socket portion 140.

In all of the embodiments of the invention as shown in FIGS. 3, 4 and 5, the spherical elements 72 are free to rotate about their centers indicated at 76 to properly align the flat closure portions 74 with the annular seats 124 to insure closing without leakage.

A pressure regulator has been provided employing a spherical ball closure element having a flat surface to engage a valve seat with the spherical surface seated in a socket member to permit rotation of the ball for accurate alignment of the flat closure surface with the valve seat. The spherical seat for the ball element engages only a portion of the surface and is disposed completely to one side of the center of the spherical element to insure easy rotation of the valve closure element. In two embodiments of the invention the spherical closure element is maintained in the spherical socket through the action of resilient means. In one of those embodiments the resilient means is a spring which also insures that the valve opens under slight pressure fluctuations. In the other of the embodiments the resilient means is formed by a retaining ring which also acts to hold spherical closure element in the spherical socket.

In all of the embodiments of the invention the flat closure portion of the spherical closure element affords accurate alignment in the closed position of the value to prevent fluid leakage.

The embodiments of the invention in which an exclusive property or privilege is claimed are defined as follows:

1. A pressure regulator including a housing, a diaphragm in said housing forming a chamber at one side thereof, an inlet port and a relief port communicating with said chamber, a valve seat associated with said relief port, a valve assembly engageable with said seat to prevent communication between said ports, said valve assembly including a socket member movable with said diaphragm, a closure element in the form of a segmented sphere having a flat valve seat engaging surface disposed to one side of the center of said sphere a distance less than the sphere radius, said sphere being disposed in said socket for movement about the center of said sphere upon engagement of said flat surface with said seat, and a spring biasing said diaphragm and valve assembly toward said seat in opposition to pressure at said inlet port, a retainer member engaging said sphere, biasing means acting between said housing and said retainer to hold said sphere in said socket member and to urge said seat engaging surface out of engagement with said valve seat, said retainer member having fingers engageable with an interior portion of said housing to limit movement of and to maintain said biasing means confined relative to said housing during assembly of said pressure regulator.

2. The combination of claim 1 wherein said fingers are flexible, lock portions formed at the end of said fingers for disposition in recesses restraining movement of said retainer member, and cam means for flexing said fingers and guiding said lock portions into said recesses during movement of said retainer relative to said housing.

3. The combination of claim 1 wherein said diaphragm is a continuous, imperforate piece of flexible material.

4. The pressure regulator of claim 1 wherein said retainer member has an annular portion surrounding said seat and engaging said sphere, said biasing means maintaining said annular portion in continuous engagement with said sphere during movement of said sphere into and out of engagement with said seat.

* * * * *

UNITED STATES PATENT AND TRADEMARK OFFICE
CERTIFICATE OF CORRECTION

PATENT NO. : 4,237,924
DATED : December 9, 1980
INVENTOR(S) : Benjamin C. Benjamin, Charles A. Detweiler It is certified that error appears in the above—identified patent and that said Letters Patent is hereby corrected as shown below:

Column 2, line 49, "Chamber 39" should read --Chamber 38--

Signed and Sealed this

Ninth Day of February 1982

[SEAL]

Attest:

GERALD J. MOSSINGHOFF

*Attesting Officer*  *Commissioner of Patents and Trademarks*